United States Patent [19]
Berdut

[11] Patent Number: 5,586,505
[45] Date of Patent: Dec. 24, 1996

[54] LEVITATION SYSTEM USING PERMANENT MAGNETS FOR USE WITH TRAINS AND THE LIKE TYPE OF RIGHT-OF-WAY VEHICLES

[76] Inventor: Elberto Berdut, Orquidea No. 98, Santa Maria, Guaynabo, Puerto Rico, 00926

[21] Appl. No.: 392,247

[22] Filed: Feb. 22, 1995

Related U.S. Application Data

[63] Continuation-in-part of Ser. No. 184,440, Jan. 21, 1994, Pat. No. 5,452,663, which is a continuation-in-part of Ser. No. 45,863, Apr. 14, 1993, Pat. No. 5,431,109.

[51] Int. Cl.$^6$ ................................................. B60L 13/10
[52] U.S. Cl. .................... 104/283; 104/286; 104/290; 104/294
[58] Field of Search .............................. 104/281, 283, 104/284, 286, 290, 292, 294; 318/135; 310/12, 13, 14, 127, 128, 129, 152, 154, 155, 156; 188/267, 284

[56] References Cited

U.S. PATENT DOCUMENTS

| | | | |
|---|---|---|---|
| 3,791,309 | 2/1974 | Baermann | 104/283 |
| 3,885,504 | 5/1975 | Baermann | 104/283 |
| 3,895,585 | 7/1975 | Schwarzler | 104/290 |
| 3,899,979 | 8/1975 | Godsey, Jr. | 104/283 |
| 4,148,260 | 4/1979 | Minovitch | 104/283 |
| 4,151,447 | 4/1979 | von der Heide et al. | 104/290 |
| 4,307,668 | 12/1981 | Vinson | 104/281 |
| 4,641,065 | 2/1987 | Shibuki et al. | 310/13 |
| 4,711,182 | 12/1987 | Alexandrov et al. | 104/283 |
| 5,072,144 | 12/1991 | Saito et al. | 310/12 |
| 5,165,347 | 11/1992 | Wagner | 104/283 |
| 5,343,811 | 9/1994 | Schuster | 104/283 |

OTHER PUBLICATIONS

"Ceramic 5 Magnets–Typical Ceramic 5 Magnetic Material Characteristics", How to Order Sheet, Prior to Feb. 22, 1995, 104/286.
"General Information–Standard Magnets", pp. 3–6.
"NMI Notes", US. Department of Transportation, Federal Railroad Administration, U.S. Army Corps of Engineers, U.S. Department of Energy, No. 7, Nov. 1992, MAGLEV.

*Primary Examiner*—S. Joseph Morano
*Attorney, Agent, or Firm*—Ronald P. Kananen

[57] ABSTRACT

The invention relates to a magnetic unit having a plurality of groups of permanent magnets such as ceramic or ferrous magnets arranged in a side-by-side relationship, each plurality being separated from an adjacent plurality by a magnetically permeable member, such as a malleable steel member or a malleable iron or molded iron member to focus the lines of magnetic flux. Preferably, each of the permanent magnets within a group is also separated by an interleaved sheet of magnetically permeable material. Such a plurality of groups of permanent magnets are secured together to form a channel therebetween in which a supporting member is connected through fastening members to a movable levitated member.

13 Claims, 10 Drawing Sheets

LEVITATION SYSTEM USING PERMANENT MAGNETS FOR USE WITH TRAINS AND THE LIKE TYPE OF RIGHT-OF-WAY VEHICLES

This application is a continuation-in-part of the applicant's prior application Ser. No. 08/184,440 filed on Jan. 21, 1994, now U.S. Pat. No. 5,452,663, which in turn is a continuation-in-part of Ser. No. 08/045,863, filed on Apr. 14, 1993 now U.S. Pat. No. 5,431,109.

BACKGROUND OF THE INVENTION

This invention relates to a movable vehicle, such as a train, which uses a plurality of magnetic units, each comprising a plurality of permanent magnets and interleaved iron or steel members, for both levitation and for acting as a linear or rotary motor. More particularly, this invention relates to a levitated train using such magnetic units arranged to repel or attract each other, thus to lift the train from a track while being laterally supported. More particularly, this invention relates to a levitated train which uses such magnetic units as a basis for a linear motor for propelling the train. Still more particularly, this invention relates to the magnetic units themselves, each having a plurality of permanent ceramic or ferrous magnets interleaved between associated sheets of malleable steel or malleable or molded iron. Still more particularly, this improvement relates to an improved, upwardly-oriented levitation system using such magnetic units for rail vehicles.

DESCRIPTION OF THE PRIOR ART

In U.S. Pat. No. 3,791,309 to Baermann, it was recognized that it has been known to suspend vehicles such as trains along a supporting line or track by air cushions, or along a track made from a magnetically attracted material. In one such vehicle, the vehicle has electromagnets mounted thereon and the vehicle is suspended with respect to the track by utilizing the attractive forces between the electromagnets and the track. Some means are provided for maintaining an intermediate air gap between the electromagnets and the track. However, such an arrangement requires a relatively high amount of energy to energize the magnets in order to achieve the strong magnetic forces necessary. Baermann also recognized that the use of superconductivity has been studied for this purpose. However, that use suffered from the difficulty of maintaining the low temperatures required by superconductivity along the entire track.

Baermann thus proposed a magnetic levitation system using electromagnets arranged in a repulsive force arrangement with lateral support structures for the vehicle. However, it remained a problem to avoid the need for providing power to such electromagnets. Thus, Baermann shows main permanent magnets and additional permanent magnets that span spaces between the main magnets which have like poles facing like poles, thus to increase the available suspension forces.

In the Minovitch U.S. Pat. No. 4,148,260, the use is disclosed of ceramic ferrite brick magnets placed in an end-to-end relationship along a steel channel, with a similar grouping opposed thereto, thus to eliminate flux leakage while providing lateral stability and an increased repulsive force.

It has, however, continued to be a problem in this art to effectively utilize permanent magnet systems for levitation, and to provide simple propulsion means for such levitated systems.

It has also been a continuing problem in this art to provide a basic ceramic magnet unit to act as a building block for levitation systems which do not require electromagnetics.

The foregoing and other shortcomings of the prior art will become apparent from a review of the detailed description of this invention which follows.

In the applicant's prior copending applications, a solution to the foregoing problems is offered. This application, however, is directed to an improvement in the levitation system there disclosed in which a plurality of such basic permanent units are used to suspend the levitated vehicle. The details of this improvement and modifications to the improvement will be seen from a review of this detailed specification which follows.

BRIEF SUMMARY OF THE INVENTION

It is an overall object of this invention to provide a magnetic unit suitable for use in levitating a vehicle, such as a train, which unit uses permanent magnets, such as ceramic or ferrous magnets.

It is another overall object of this invention to provide such a magnetic unit using a plurality of permanent magnets, such as ceramic or ferrous magnets individually using a magnetically permeable material, such as malleable steel or malleable or molded iron, between the magnets, and a plurality of such magnetic units connected together with such magnetically permeable members therebetween.

It is another overall object of this invention to use such magnetic units on opposing portions of a support member for a train and a support member on a track system and arranged to controllably attract each other thus to cause levitation of the train relative to the track.

These and other objects of this invention will become also become apparent from a detailed description of the invention which follows.

A main feature of the invention relates to a magnetic unit comprising a plurality of groups of permanent magnets such as ceramic or ferrous magnets arranged in a side-by-side relationship with like poles facing each other, each plurality being separated from an adjacent plurality by a magnetically permeable member, such as a malleable steel member or a malleable or molded iron member, to focus the lines of magnetic flux. Preferably, each of the ceramic magnets within a group is also separated by an interleaved sheet of malleable steel. Such a plurality of groups of ceramic magnets are secured together and to a supporting member through fastening members, and are separated from the support by a non-magnetic member, such as a non-ferrous plate. A second plurality of groups of permanent magnets, such as ceramic or ferrous magnets, are positioned adjacent to a first plurality of such groups of ceramic magnets with like or opposite poles of the magnets facing each other so that the first and the second pluralities of such groups of magnetics respectively repel or attract one another. Those forces of repulsion or attraction are used to cause levitation of a vehicle such as a train.

A second feature of the invention relates to a combination of a plurality of such groups of magnetic units so arranged relative to a support member of a train and an adjacent track member. A pair of such plurality of such groups of magnetic units are preferably positioned on opposed sides of the vehicle for balance and for increased levitation strength. A hydraulic unit, which may be microprocessor controlled, is used to adjust the air gap between respective pairs of such units.

A third feature of the invention, and a main feature of this improvement application relates to the use of a magnetic unit of the type comprising a first group of at least a first pair of permanent magnets comprising either ceramic magnets or ferrous magnets having like poles of said permanent magnets positioned adjacent an outer surface of each other; a second group of at least a second pair of permanent magnets comprising either ceramic magnets or ferrous magnets having like poles of said permanent magnets positioned adjacent each other, said first and said second groups of said permanent magnets defining a channel therebetween; at least a third pair of magnetically permeable members comprising malleable steel members, malleable iron members, or molded iron members, one of said third pair being respectively located between said adjacent surfaces of said pair of permanent magnets and located adjacent each outer surface of said pair of permanent magnets; and means for securing said pair of magnetically permeable members and said pair of permanent magnets, thus to provide a magnetic unit which concentrates its magnetic flux through said malleable steel members at opposed locations in said channel; and at least a third permanent magnet located in said channel, a pole of said third magnet being positioned adjacent an opposite magnetic pole of said first pair of permanent magnets at a surface of one of said magnetically permeable members, an opposite pole of said third magnet being positioned adjacent an opposite magnetic pole of said second pair of permanent magnets at a surface of another of said magnetically permeable members, thus to maintain a stable positional relationship by the magnetic effect of the relationship among said first, second, and third permanent magnets.

The magnetic unit as described further includes a malleable steel member located between said permanent magnets forming said first and said second pairs of permanent magnets. The magnetic unit further includes a support member for supporting said third permanent magnet in said channel, said support member being secured to a second support member for a portion of said vehicle.

In the magnetic unit as described, the magnetically permeable members located at the outer surfaces of said permanent magnet members are generally L-shaped, while the magnetically permeable member located between a pair of said groups of said magnetic members is generally T-shaped. The magnetic unit has a sufficient plurality of said pairs of said groups of magnets positioned along a right-of-way to cause a vehicle, such as a train, to be levitated for translational motion.

Alternative embodiments of such improvement structures are also disclosed, including stacks of permanent magnets greater than two in number, alternate methods of holding the magnets relative to the fixed and movable structures, and alternate suspension structures.

These and other features of the invention will be seen in the detailed description of the invention which follows.

DETAILED DESCRIPTION OF THE PREFERRED EMBODIMENTS

Figure 1:
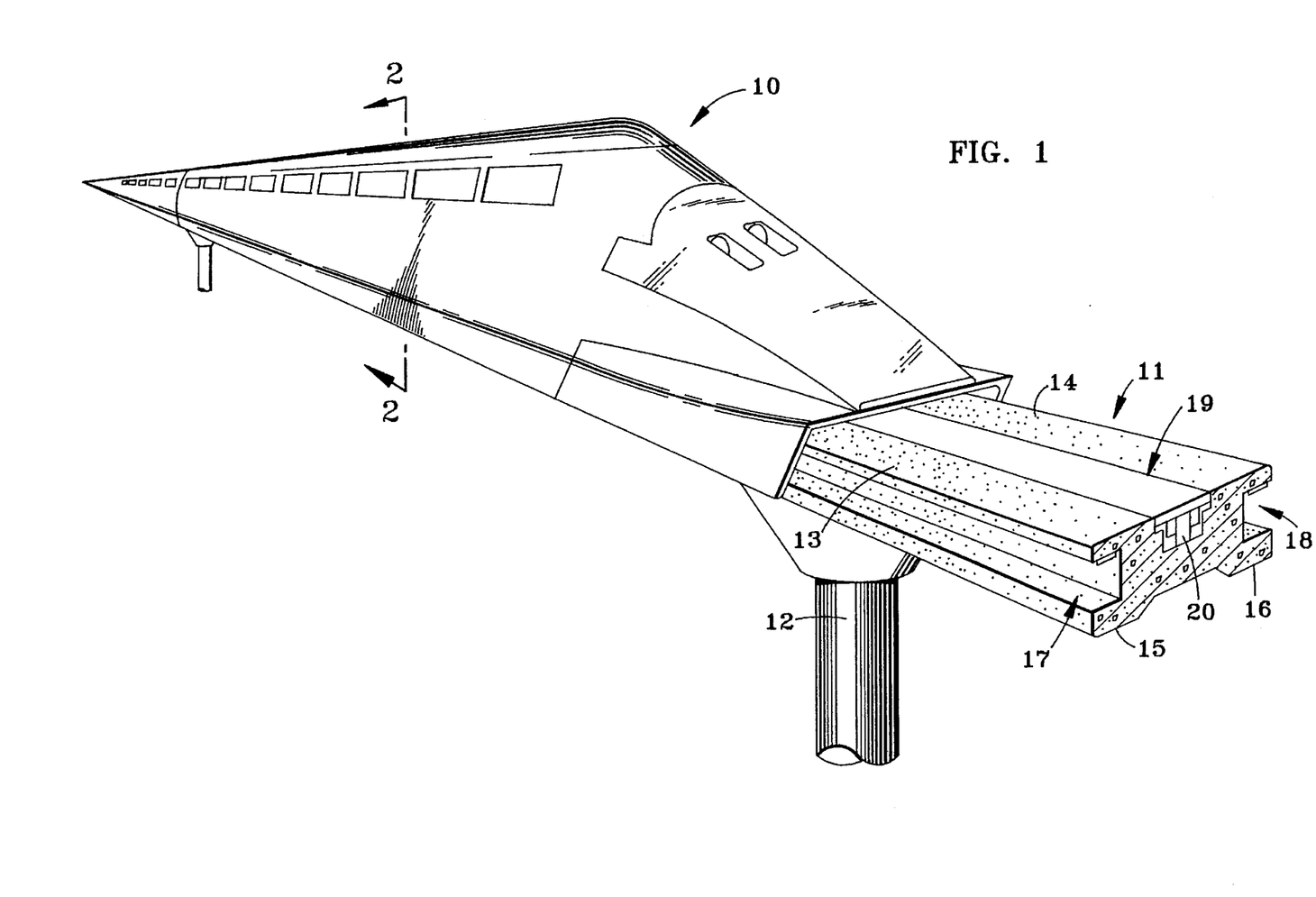
FIG. 1 is a perspective view of a train incorporating the invention travelling on a rail supported above the terrain.

In FIG. 1, a train 10 incorporating the invention is supported on an elongated concrete beam member 11 supported above the terrain by a plurality of stanchions 12. The beam member 11 includes a pair of spaced, opposed horizontal members 13, 14 extending generally horizontally at the top of the beam member 11, and a similar pair of spaced, opposed horizontal members 15, 16 extending generally horizontally at the bottom of the beam member 11. The beam member thus defines a pair of opposed, generally horizontally-extending channels 17, 18 each receiving magnetic rails for the train 10 as will be discussed in greater detail. The channel 17 is defined between the upper horizontally-extending member 13 and the lower horizontally-extending member 15, while the channel 18 is defined between the upper horizontally-extending member 14 and the lower horizontally extending member 16.

A second channel 20 is defined at the upper portion of the beam 11 for receiving a horizontally extending linear motor, referred to generally with the reference numeral 19. The linear motor 19 will be discussed in greater detail later in this specification.

Figure 2:
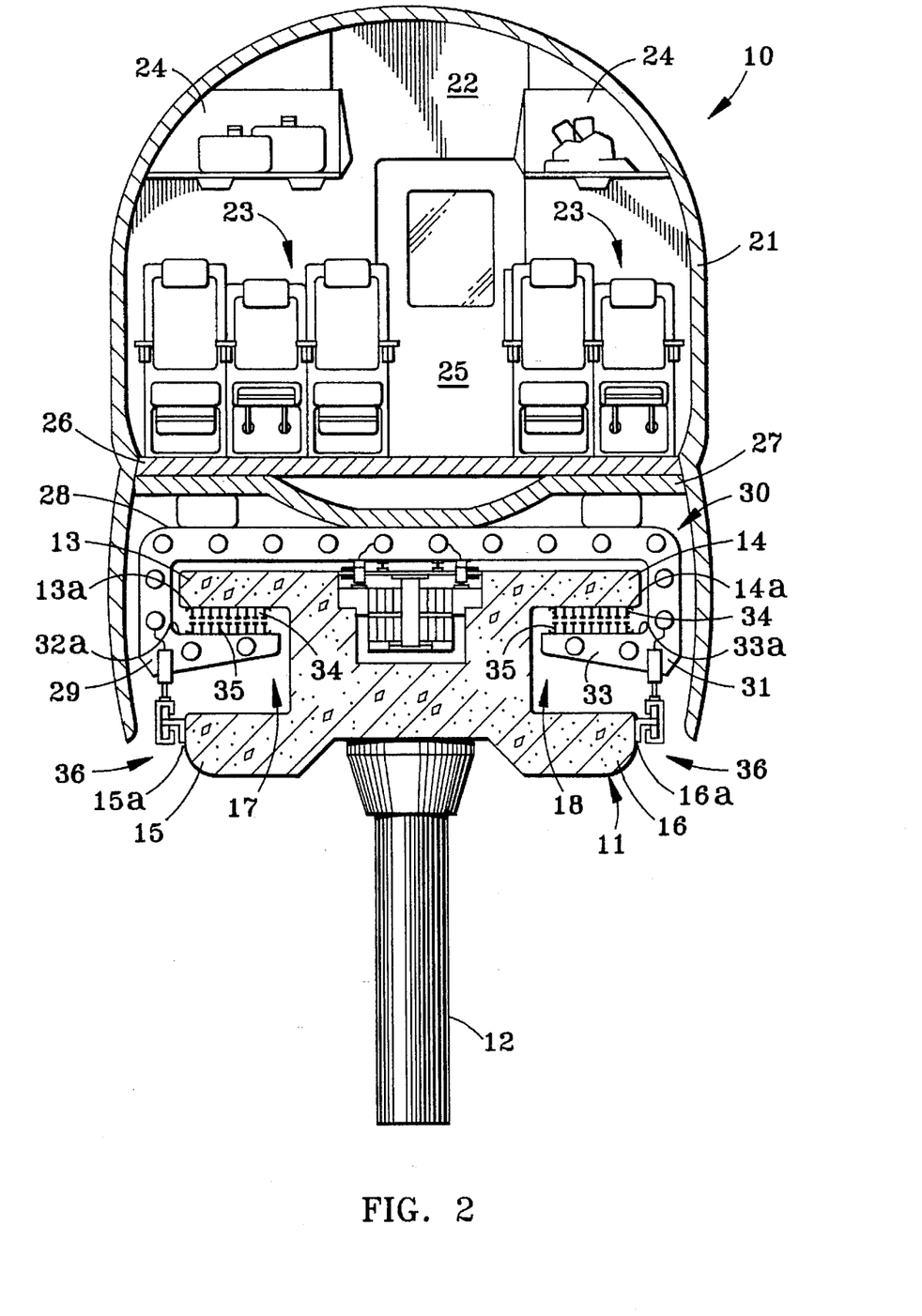
FIG. 2 is a cross sectional view of the train taken along the line 2—2 of FIG. 1.

FIG. 2 is a transverse cross sectional view of the train 10 taken along the line 2—2 of FIG. 1. The train 10 comprises, in simplified detail, an outer skin member 21 defining an interior compartment 22 having a plurality of seats 23 and overhead luggage compartments 24. An ingress/egress door is shown at 25. The interior compartment is supported on a structural bearing member 26. It should be understood that the depiction of the train 10 is representative and that the actual construction can assume a number of different forms well known in the public transportation arts.

The structural bearing member 26 extends transversely to the beam 11 and has a spring-like structural bearing member 27 secured at its opposed ends to the bearing member 26. A portion of the bearing member 27 is spaced from the bearing member 26 and contacts a massive C-shaped train support member 30 having a transversely extending surface portion 28, merging with opposed downwardly extending legs 29, 31 spaced apart wider that the upper surface of the beam 11 at its generally horizontally extending upper members 13, 14. Inwardly-turned horizontally extending bearing members 32, 33 are respectively secured at the opposed lower ends of the downwardly extending legs 29, 31 so as to define upper surfaces 29a, 31a which are normally spaced from lower surfaces 13a, 14a of the generally horizontally extending members 13, 14 of the beam 11. The inwardly-turned horizontally extending members 32, 33 thus extend inwardly within the channels 17, 18 for traveling along the beam.

A plurality of magnetic units shown generally at the reference numeral 34 are secured to the lower surfaces 13a, 14a of each of the horizontally extending members 13, 14 while a plurality of mating magnetic units shown generally at the reference numeral 35 are secured to the upper surfaces 32a, 33a of the members 32, 33. The magnetic units are arranged in pairs and their magnetic poles selected so that magnetically attractive forces are generated thus to attract the arms 32, 33 toward the member 13, 14. Thus, the downward weight of the train 10 can be controllably attracted to the lower surfaces 13a, 14a within limits sufficient to define an appropriate gap, as will be discussed. When so levitated, the train 10 can then be propelled longitudinally along the beam 11 by a minimal amount of force sufficient to overcome air friction and grade forces.

Figure 3:
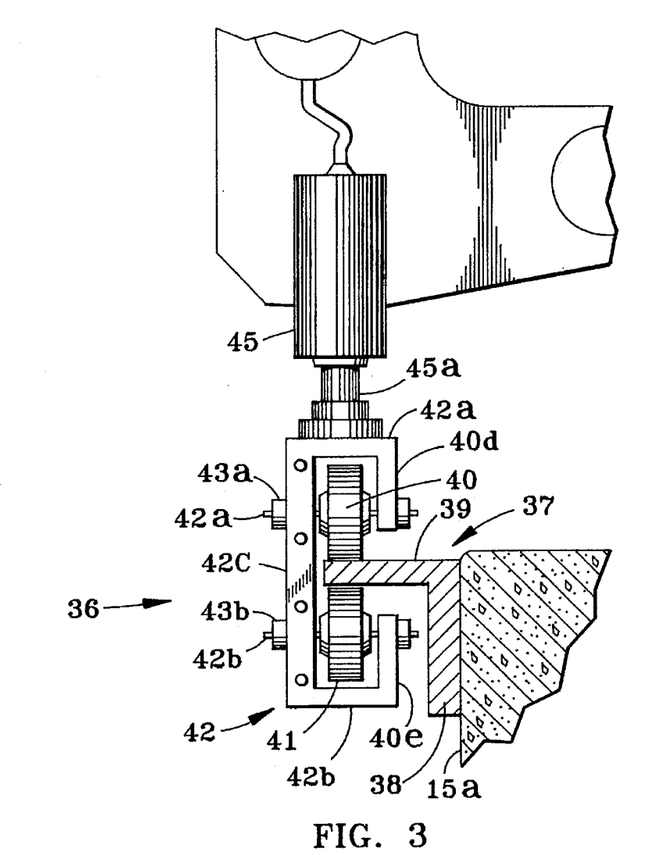
FIG. 3 is a front cross sectional view of a portion of FIG. 2 showing a portion of a hydraulic system used to control distance between magnetic fields.
Figure 4:
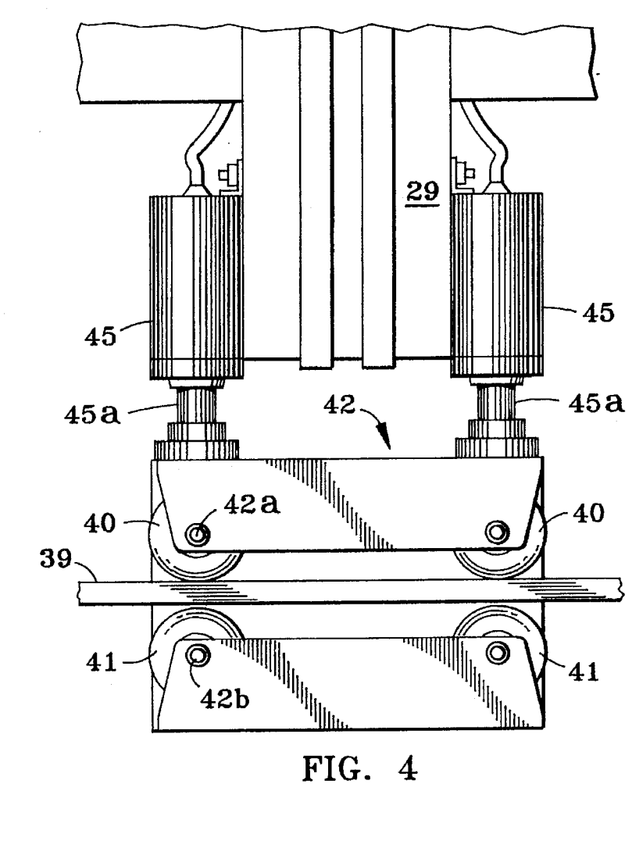
FIG. 4 is a lateral view of the same portion as shown in FIG. 3.

FIGS. 3 and 4 show an at-rest roller mechanism for the train, as shown generally at the reference numeral 36, having a hydraulic adjustment capability. Each of a pair of generally L-shaped members 37 has a generally vertical leg 38 secured to an outer surface 15a, 16a of the lower, generally horizontally extending members 15, 16. The leg merges to a horizontally extending leg 39 spaced intermediate the outer horizontally extending surfaces of a pair of roller members 40, 41, each of which is respectively secured to a roller support bracket 42 which is C-shaped in cross section. The roller bracket 42 includes a horizontally extending upper surface 42a, a generally horizontally extending lower surface 42b spaced from the upper surface 42a, each of which respectively merges with a generally vertical member 42c. A pair of spaced vertically extending members 42c respectively merge at their ends with respective opposed ends of the members 42a, 42b. Thus, the rollers 40 are respectively rotationally mounted about axles 42a, 42b between the legs 40d and 40c, for the roller 40, and between the legs 40e and 40c. Securing nuts 43a, and 43b are secured at the opposed ends of the axles 42a and 42b.

An upper surface of the leg 42a is secured to a leg member 45a of a hydraulic actuator unit 45 secured to the member 29. The hydraulic actuator is controlled by microprocessors to maintain a predetermined air gap between the adjacent magnetic units 35. The computer will take into account such data as the current weight load of the train, the current air gap, the desired air gap, and the maintenance history of the rail. Starting with the units in juxtaposition, the hydraulic actuators will cause the units to separate to the desired degree of separation, e.g. about ⅛ to ¼ in. or so.

Figure 5:
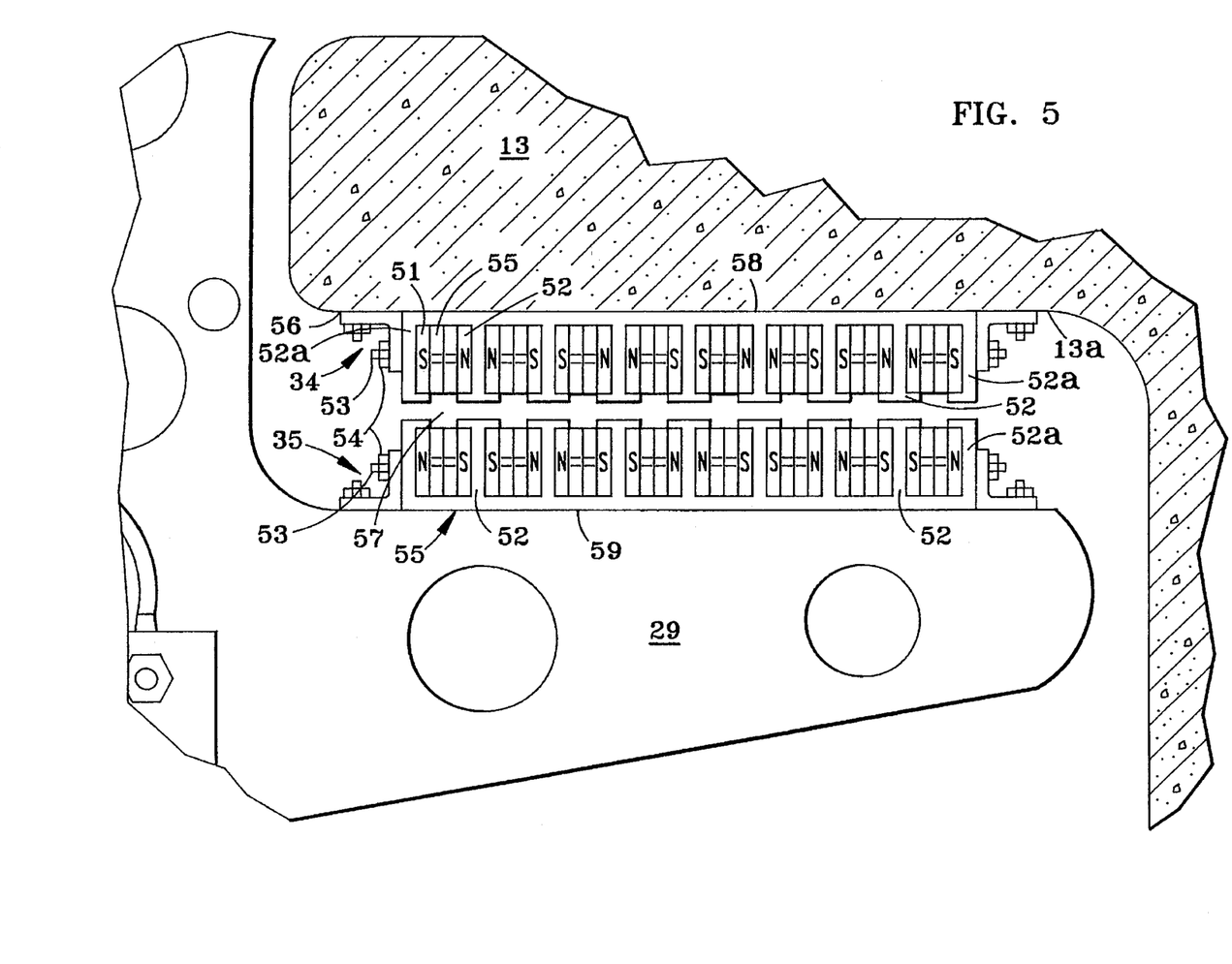
FIG. 5 is a front view, partially in cross section, showing a portion of the magnetic levitation system of FIG. 2.

FIG. 5 shows in greater detail the construction of each of the magnetic units 35. Each magnetic unit comprises a plurality of bar-shaped permanent magnets 51, such as ceramic or ferrous magnets separated by a plurality of generally T-shaped magnetically permeable members 52, such as malleable steel rails or malleable or molded iron members, wherein the end members 52a are generally L-shaped. A sandwich like construction unit 55 is formed by alternating an end member 52a, a permanent magnet 51, a magnetically permeable member 52, another permanent magnet 51 or a plurality of such magnets, and so forth. Each of the sandwich like construction units is secured together as by a non-magnetic bolt 53, secured at its opposing ends by a non-magnetic fastener 54. Preferably, each group of permanent magnets is separated by a magnetically permeable member located between adjacent permanent magnets, and each of a plurality of such groups is separated by a magnetically permeable member, such as malleable steel plate or a malleable or molded iron plate.

Ceramic magnets are readily commercially available and are selected for their magnetic strength and physical sizing from commercial sources. At present, ferrous permanent magnets are preferred because of their greater force capabilities. A suitable ferrous permanent magnet developed by Delco-Remy is known as a Magnequench brand permanent magnet and can attain an effective force of 12 to 14 kilogauss compared to ceramic magnets that can develop a force of 7 to 9 kilogauss. In contrast, the invention develops about 100 kilogauss when using the Magnequench brand permanent magnet and the magnetically permeable members.

The construction units 55 are respectively secured to the horizontally extended member 13 and to the support member 29 by a pair of opposed L-shaped members 56 respectively secured to both the members 13, 29 and to the construction units 55. The space between the construction units 55 is shown generally by the reference numeral 57 and is the space controlled by the hydraulic system shown in FIG. 4. A construction unit 51 is secured to the horizontally extending member through a non-ferrous metal protector 58. Similarly, a second construction unit 51 is secured to the support unit 29 through a non-ferrous metal protector 59.

The poles of the ceramic units are arranged to alternate linearly transversely across the unit 51. That is, the arrangement of magnets is S-N-N-S-S-N-N and so forth. In contrast, the adjacent unit 51 is arranged according to the scheme N-S-S-N-N-S-S and so forth. When placed adjacently, opposite poles are in register creating magnetic forces of attraction between the two units.

The construction units 55 thus use passive energy produced by a combination of ceramic magnets 51 and malleable steel members 52. This combination of materials provides the same results as conventional copper wire wound around a malleable steel core and electricity. An advantage of such a unit is that it does not create thermal energy to become hot and does not produce electromagnetic energy which may be harmful. Nor does it use energy except what is required to be applied to the ceramic magnets to produce permanent magnetic force.

The magnetic units 55 with an air gap 57 of ½" to ⅛" using the forces of attraction can levitate a great amount of weight at very low costs. A rail 1 ¼" thick can levitate 5 lbs. per sq. in. and a 3" rail can levitate 10 lbs. per sq. in. with an air gap of ⅛". Thus, vehicles traveling by this means of levitation effectively float above the travel rail with friction markedly reduced, thus producing little wear on the equipment. Energy consumption is limited to a start movement and displacing air drag and any grade changes on the track, and to operation of brakes (not shown).

Alternately, the respective magnet units can be positioned in supporting structures to repel one another when the forces of repulsion provide levitation for the unit.

Such units have many uses and may be used, for example, for high speed passenger trains traveling over 300 mph and for low speed innercity transportation, as well as for transporting freight. Thus, systems using such units save time and fuel, while protecting the environment from fuel emissions.

FIGS. 6 to 11 show several embodiments of an alternative magnetic levitation system according to the invention of this improvement application. To the extent any of these figures refers to like elements to those shown in FIGS. 1 to 5, such elements are identified with like reference numerals.

FIGS. 6 to 11 thus show a magnetic rail system used to lift small and large volumes of weight. In general, the magnetic rail system is composed of a fixed magnetic tunnel or channel, as described in connection with FIGS. 6 to 11, with pairs of magnetic fields having two, but preferably three or more, poles. The poles are parallel to each other and can be of any length to permit stabilizing the levitated vehicle along the tunnel or channel. Each pole is comprised of the T-shaped rail of a magnetically permeable material such as a malleable steel or iron described previously in this application. Two or more permanent magnets are placed on each side of the long portion or head of the T-shaped structure having a laterally extending head secured to a transversely-extending leg, with the like magnetic poles aimed toward the head of the T-shaped structure. Once the permanent magnets are placed on each side of the T-shaped rail, a magnetic energy flow is produced toward the top or head of the "T". The reaction is thus somewhat similar to that produced when electricity is applied to an electromagnetic coil. In these improved embodiments, the T-shaped rail gathers and converges substantially all of the dispersed energy from the permanent magnets and concentrates it in the top of the T-shaped member, thus increasing the power of the permanent magnet to attract and repel by as much as 500% or more.

As will be seen, the tunnel or channel is fitted with a plurality, such as four, metal or plastic bands to support wheels of the movable portion along the channel and to prevent the wheels from adhering to the magnetic fields.

The second major component of the improved system is the movable portion, secured to the levitated train for example, which is composed of permanent magnets that work directly without combining them with ferrous material. These magnets, fixed to a skid-shaped car, slide through the magnetic tunnel on either of a pair of pairs of wheels mounted on retainers. They are supported by the metal or plastic bands set into the tunnel alongside the magnetic fields. The permanent magnets of the magnetic fields set into the railway work indirectly, while the fields of the movable part or sliding skid work directly.

The fixed fields of the tunnel and the fields of the car or skid are preferably kept at a distance of about ⅛" or more from each other to keep them through their adjacent magnets from adhering. The improved levitation system, therefore, can be thus designed for minimum loads of 10 pounds per linear foot to up to 2,000 pounds or more per linear foot. For example, a load of 7900 pounds per linear foot requires seven (7) poles in each field of the tunnel with a density of the field of approximately 1¾" and a depth of the tunnel or channel of ten inches (10"). It uses 25 pounds of ceramic magnets per linear foot, equivalent to 3.5% of the volume to be lifted. The ratio is the same on the skid, using 70 pounds of ceramic magnetics for each ton to be lifted. Such material requirements make the cost-per-mile analysis attractive for implementing the invention.

The skids are mounted individually or in a series, depending on the job to be done. Each railway, or levitated track system, can be installed individually, or several can be installed parallel to each other.

The skids have wheels mounted on retainers designed for each need. That is, to work at a low velocity, with slow vehicles, retainers of a low RPM are needed and for high speeds, such as more than 300 miles per hour, retainers of 16,000 RPM or more must be used. The skids are anchored to the vehicle. The retainers or wheels encounter very little friction because the lateral magnetic fields pull with the same force as the magnetic fields of the skid, neutralizing the force.

The complete system works by attraction. The poles of the skid pull the poles fixed to the rail and at the same time repel the neighboring poles, creating an attraction in the correct or neutral position and repulsion in the incorrect or perturbed position, keeping the skid from sinking or rising, and maintaining a stable line of force. This allows the skid to slide smoothly, like a boat on a lake of oil, for example.

The use of the levitation system according to this improvement is not limited to elevated high-speed and low-speed railways for transport of passengers and freight, as mainly described in this improved application. The system can also be used to lift extremely heavy sliding doors on industrial conveyors, elevated space liftoffs, elevated roller coasters, elevated acceleration vehicles, elevated moving sidewalks, and in other uses.

Figure 6:
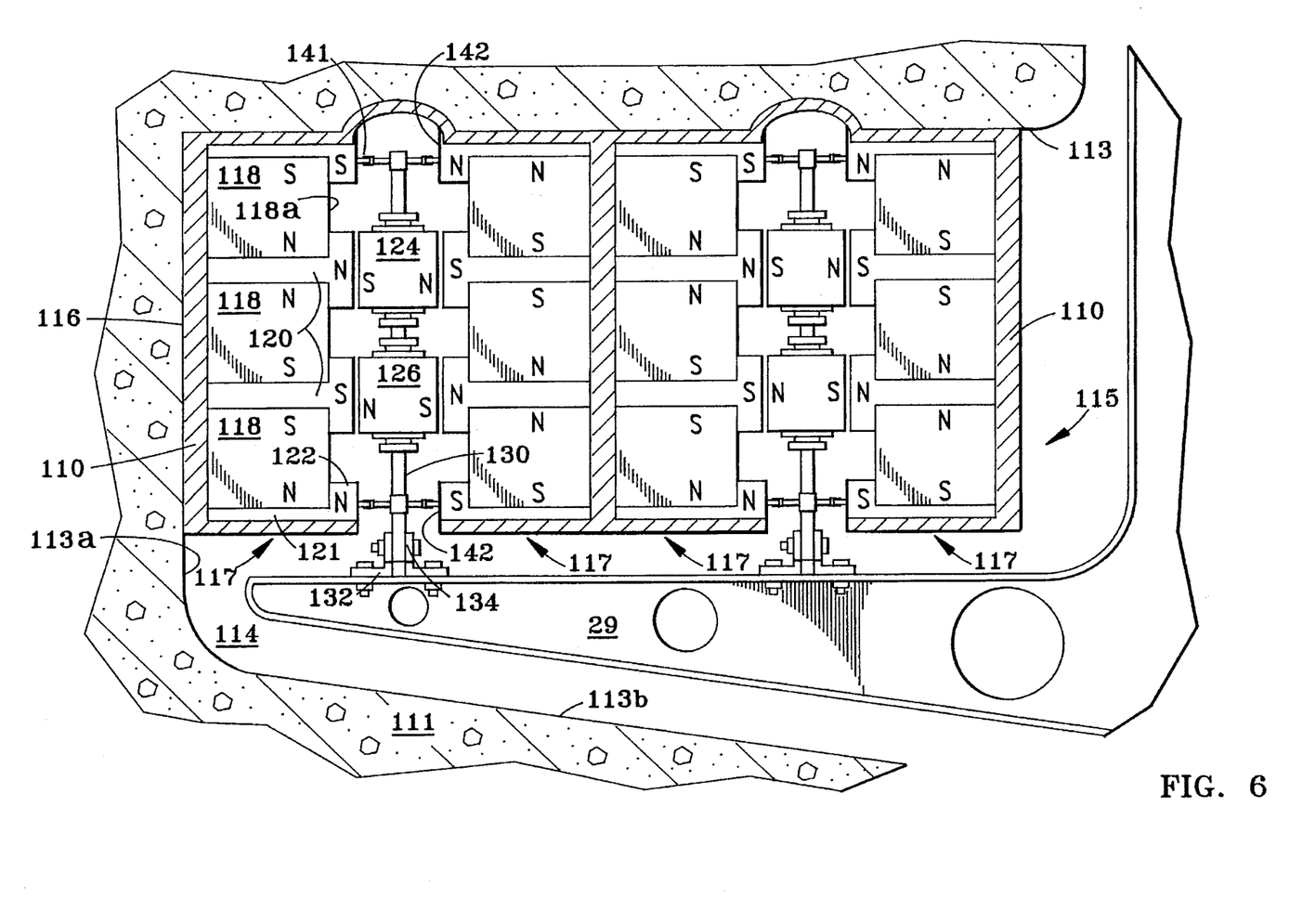
FIG. 6 shows an improved levitation system according to the improved invention having a double core levitation system.

As seen in FIG. 6, the generally horizontally extending member 113 of a beam 111 has a downwardly extending surface 113a and an upwardly extending surface 113b which together define a U-shaped channel 114. A fixed portion 115 of the magnetic levitation structure is fixed within the U-shaped channel 114 to the downwardly extending surface 113a and to the leg 116 of the channel. As seen in FIG. 6, the fixed portion 115 comprises a double core rail levitation system in which the respective cores 117 are identical. Therefore, only one of the two cores needs to be described in detail.

A core 117 comprises at least a pair of vertically aligned permanent magnets, each pair having three permanent magnets 118 as shown. The adjacently-located magnets 118 have their like poles (N,N or S,S) facing each other and the like poles are respectively separated by T-shaped magnetically permeable members 120, such as malleable steel members, malleable iron members, or molded iron members, as described in greater detail above. The base of the T-shaped members 120 are interleaved between the like poles of the permanent ceramic or ferrous magnets 118. Thus, the head of the T-shaped member 120 lies along a face of 118a of the permanent magnet 118 which is transverse to the pole face adjacent a leg of the T-shaped member. When so positioned, the magnetic pole of the head of the T-shaped member 120 assumes the magnetic polarity of the faces between which the leg of the T-shaped member 120 rests. It should be understood that only three magnets 118 are representatively shown, but a larger number can be used in a linear array like that shown, for example, in FIG. 5, but vertically-extending rather than horizontally-extending. The cores are preferably secured in a suitable container 110 secured to the fixed portion.

As described previously, the end cap members 121 have a leg adjacent a pole of an adjacent magnet 118 and a head member 122 which is effectively a half of the head of the T-shaped member 118. In effect, therefore, the end cap member is an L-shaped member having a leg 121 and a head 122. A like stack of magnets 118 is spaced from the first stack thus to define a channel therebetween to position such permanent magnets secured to an arm 29 of the vehicle.

Specifically, as seen in FIG. 6, representative permanent magnets 124 and 126 are positioned adjacent to the heads of the T-shaped members 120. The magnet 124 has its S pole positioned adjacent the N pole of the T-shaped member 120 while the magnet 126 has its N pole positioned adjacent to the S pole of the T-shaped member as seen at the left hand stack. Conversely, the N pole of the magnet 124 is positioned adjacent the S pole of the right hand stack of permanent magnets 118 while the S pole of the magnet is positioned adjacent the N pole of the right hand stack of permanent magnets.

The magnets 124 and 126 are secured to a support member 130 fixedly secured by opposed L-shaped flanges 132 bolted to an upper surface of the arm 29 and pivotal in the joint 134. The upper and lower areas of the support member 130 are connected to opposed spacer members 140 preferably providing a rolling frictional engagement by wheels 141 or a point contact engagement with an outer surface of the L-shaped magnetic end cap member 122 adjacent suitable metal or plastic bands 142.

In operation, the magnetic arrangement as shown tends to retain the position shown for slight perturbations in the vertical direction either upwardly or downwardly. That is, when the support member 120 tends to rise, the forces of attraction between the adjacently-located opposite poles of the respective magnets 124 and 126 tend to return the structure to the neutral position shown in FIG. 6. In that respect, therefore, the levitation system is self adjusting to retain its neutral orientation.

Figure 7:
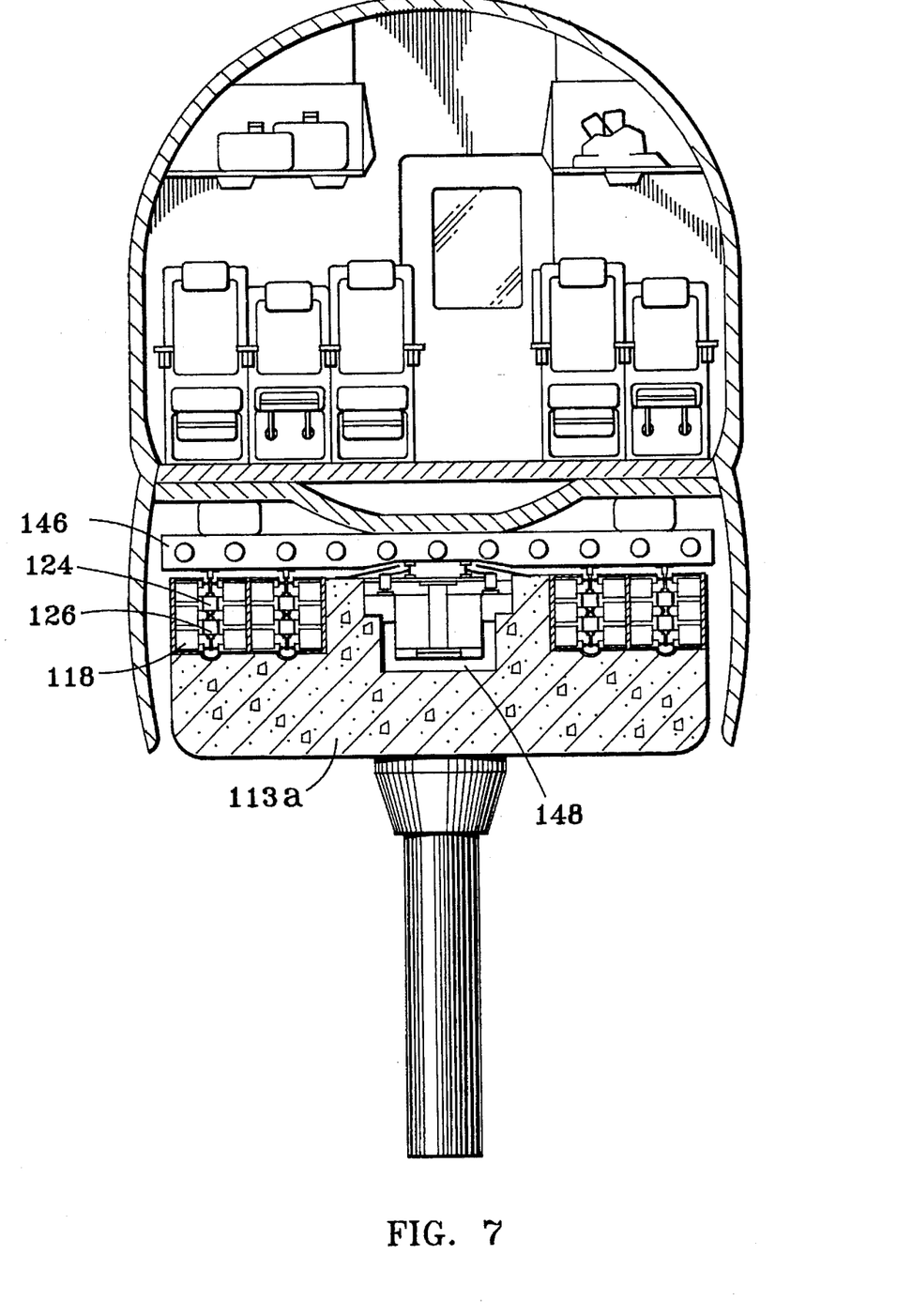
FIG. 7 shows a passenger train vehicle similar to FIG. 1 with an upwardly oriented levitation system having a pair of double core levitation systems as shown in FIG. 6.

FIG. 7 shows a passenger train having an upwardly oriented levitation system with the double core rail levitation system of FIG. 6 at each side of the beam structure 113a. The specific structure of FIG. 7 differs slightly in that the magnetic stacks are connected to a cross beam 146. Thus, FIG. 7 illustrates an alternative connection of the stacks of magnets 118 to the vehicle, such as a train. Of interest is a channel 148 housing a linear motor of the type described in U.S. patent application Ser. No. 08/184,440, filed on Jan. 21, 1994 now U.S. Pat. No. 5,452,663 issued on Sep. 26, 1995.

Figure 8:
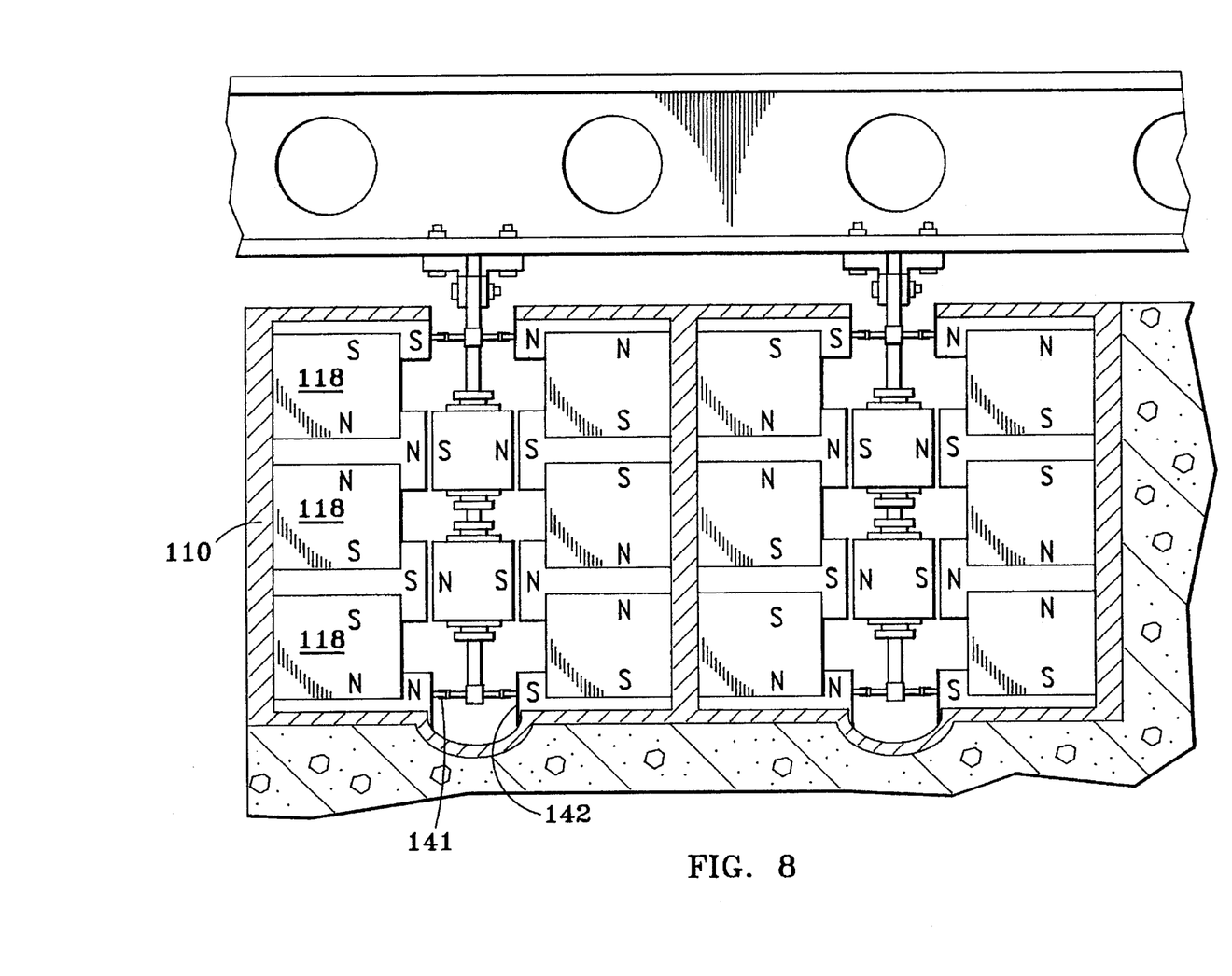
FIG. 8 shows an alternative embodiment similar to FIG. 6 as used in FIG. 7.

FIG. 8 shows the connections of FIG. 7 in greater detail, and a detailed discussion in view of the discussion of FIG. 6 is not believed to be necessary, except to note a reversal in orientation.

Figure 9:
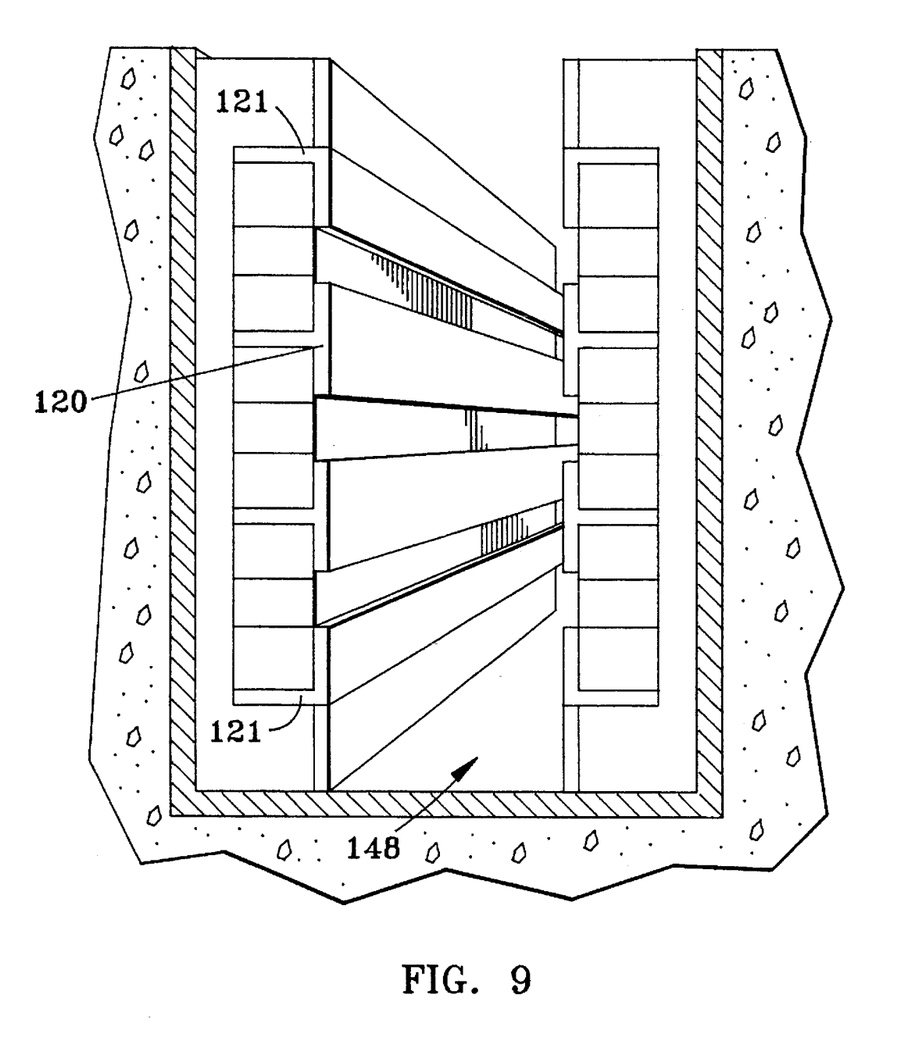
FIG. 9 shows an elongated track for the vehicle levitation system as described in this improvement.

FIG. 9 demonstrates the elongated nature of the channel wherein the magnets can be elonged and placed end to end along the channel. Similarly, the T-shaped or L-shaped members are elonged along the channel, so that the stabilizing effect of the structures shown in FIGS. 6 to 8 is maintained as the vehicle moves laterally along the channel.

Figure 10:
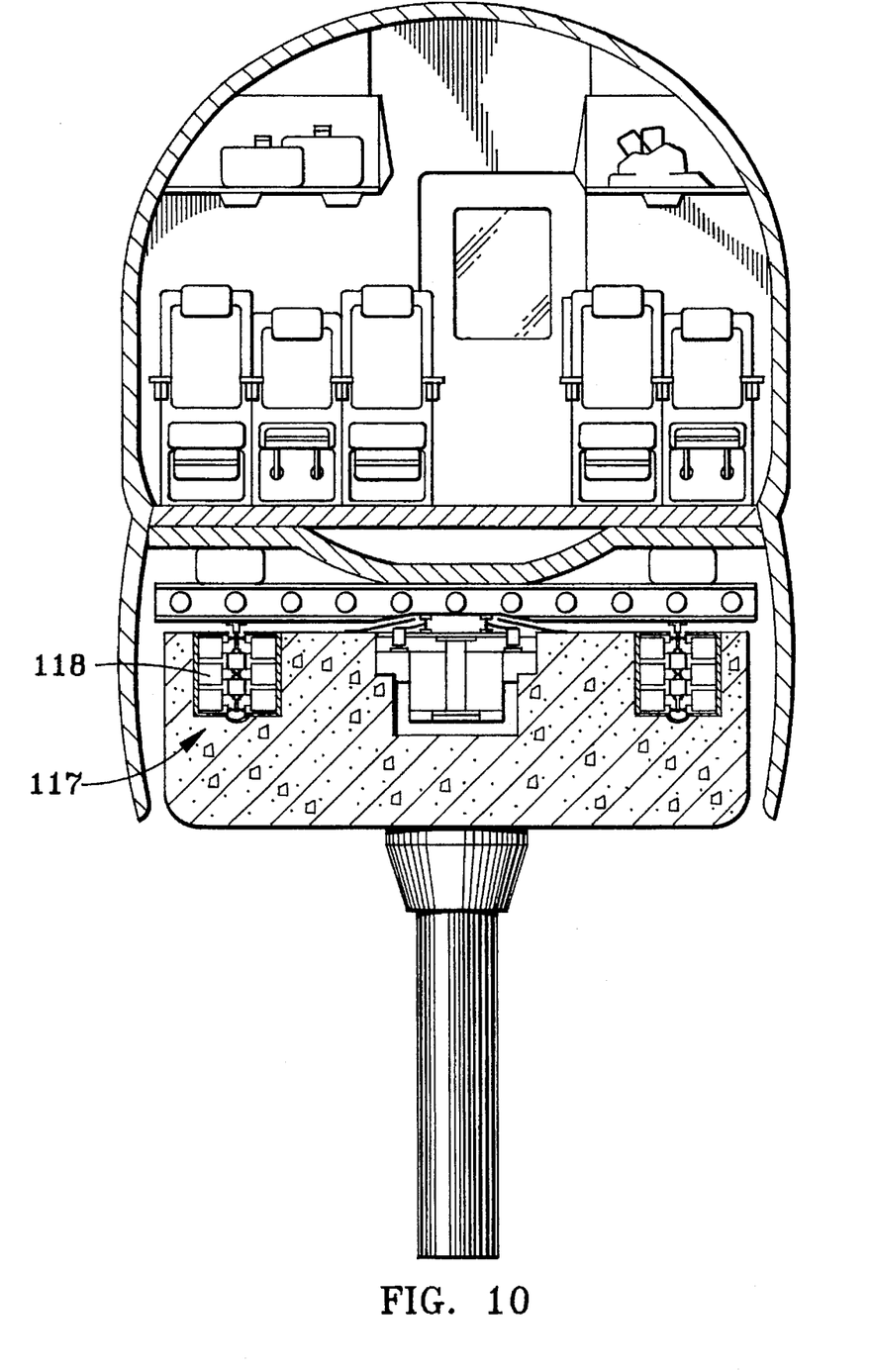
FIG. 10 shows another alternative embodiment with a magnetic levitation system formed by two opposed cores.

FIG. 10 is a view similar to FIG. 7 but illustrating that a single pair of magnetic stacks may be sufficient to levitate the vehicle, depending upon the weight of the vehicle. Otherwise, the structure of each of the stacks is as described in connection with FIG. 6.

Figure 11:
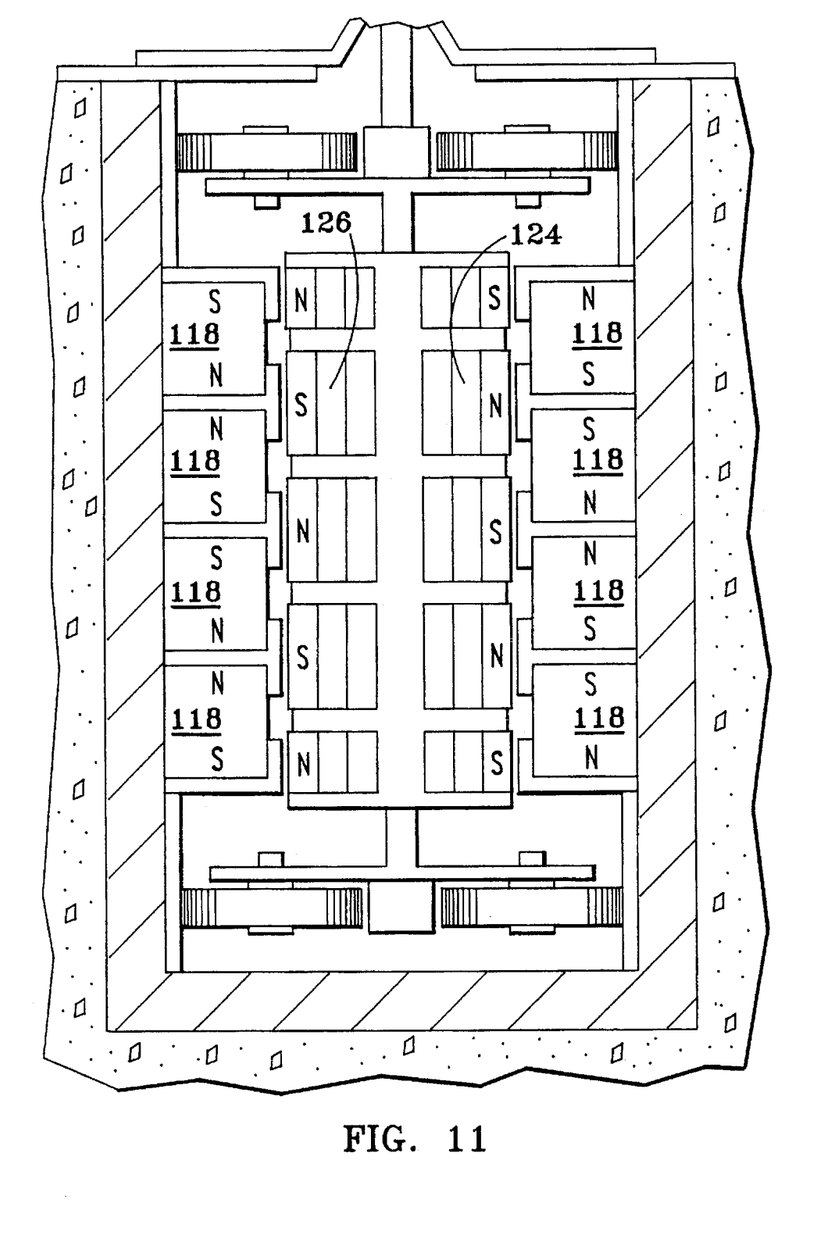
FIG. 11 shows a more detailed view of the magnetic levitation core used in the embodiment of FIG. 10, for example.

FIG. 11 shows still another example of the use of a magnetic stack of the type described to maintain the levitation of a vehicle. In this embodiment, three T-shaped magnetically permeable members are used intermediate four magnets 118. Each of the magnets similar to magnets 124 and 126 shown in FIG. 6.

What is claimed is:

1. A magnetic unit, comprising:

a first group of at least a first pair of permanent magnets comprising either ceramic magnets or ferrous magnets having like poles of said permanent magnets positioned adjacent each other;

a second group of at least a second pair of permanent magnets comprising either ceramic magnets or ferrous magnets having like poles of said permanent magnets positioned adjacent each other, said first and said second groups of said permanent magnets defining a channel therebetween;

at least a third pair of magnetically permeable members comprising malleable steel members, malleable iron members, or molded iron members, one of said third pair being respectively located between said adjacent surfaces of said pair of permanent magnets and located adjacent each outer surface of said pair of permanent magnets; and means for securing said pair of magnetically permeable members and said pair of permanent magnets, thus to provide a said magnetic unit which concentrates its magnetic flux through said malleable steel members at opposed locations in said channel;

at least a third permanent magnet located in said channel, each pole of said third magnet being positioned adjacent an opposite magnetic pole of said first pair of permanent magnets at a surface of one of said magnetically permeable members, thus to maintain a stable positional relationship by the magnetic effect of the relationship among said first, second, and third permanent magnets.

2. The magnetic unit as set forth in claim 1, wherein the permeable members are each a malleable steel member which is located between said permanent magnets forming said first and said second pairs of permanent magnets.

3. The magnetic unit as set forth in claim 1, further including a support member for supporting said third permanent magnet in said channel, said support member being secured to a second support member for a portion of a vehicle.

4. The magnetic unit as set forth in claim 1, further including at least a pair of said first and said second groups of said permanent magnets forming a pair of said magnetic units, and an additional magnetically permeable member located between said pair of said groups of said permanent magnets.

5. The magnetic unit as set forth in claim 4, wherein said magnetically permeable members located at the outer surfaces of said permanent magnets are generally L-shaped.

6. The magnetic unit as set forth in claim 4, wherein said magnetically permeable member located between said pair of said groups of said permanent magnets is generally T-shaped.

7. The magnetic unit as set forth in claim 4, wherein a first of said pair of said groups of said permanent magnets is mounted on a support member of a vehicle, and a second of said pair of said groups of said permanent magnets is mounted on a support member of a structure adjacent said vehicle, whereby attraction or repulsion of said pair contributes to levitating said vehicle.

8. The magnetic unit as set forth in claim 7, wherein means are providing for controlling a gap between said pair of groups of magnetic units.

9. The magnetic unit as set forth in claim 8, wherein said means is a hydraulic unit which is microprocessor controlled.

10. The magnetic unit as set forth in claim 9, wherein a sufficient plurality of said pairs of said groups of magnets are positioned along a right-of-way to cause the vehicle to be levitated for translational motion.

11. A system for supporting a train for traveling while levitated, comprising:

a first support member forming a portion of said train;

a stationary elongate right-of-way structure along which said train travels;

a first plurality of adjacently-spaced, generally vertically-aligned groups of permanent magnets comprising ceramic magnets or ferrous magnets placed in an elongated face-to-face relationship along said elongate right-of-way structure, said groups of said permanent magnets being separated by magnetically permeable material members which focus lines of flux into a channel defined between said plurality of groups of permanent magnets, said plurality of said groups being positioned to attract each other, said channel extending along essentially a full length of said elongate right-of-way structure; and a plurality of permanent magnets located in said channel with opposite magnetic poles facing poles on said first plurality of groups of permanent magnets; and a third support member interconnecting said plurality of permanent magnets located in said channel with said first support member.

12. The system as set forth in claim 11, further including roller guide means secured to said third support member for projecting outwardly toward wall portions immediately proximate said channel and for remaining in a normally non-contact relationship with the wall portions.

13. A magnetic levitations system comprising:

at least a first pair of permanent magnets having like poles facing each other;

at least a second pair of permanent magnets having like poles facing each other and located at a distance from said first pair defining a channel;

at least one permanent magnet located in said channel having opposite magnetic poles respectively located adjacent opposite poles of said first and second pair of permanent magnets respectively;

a first magnetically permeable member located between each of said first pair of permanent magnets and a second magnetically permeable member located between each of said second pair of permanent magnets, said magnetically permeable member being substantially in the shape of a "T" having a leg located between said permanent magnets and a head defining a magnetic pole like the poles of said permanent magnets between which said leg is located.

* * * * *